United States Patent
Jäberg

(10) Patent No.: US 6,644,632 B1
(45) Date of Patent: Nov. 11, 2003

(54) AIR SPRING DEVICE FOR LOAD-CARRYING VEHICLES

(75) Inventor: Björn Jäberg, Ytterby (SE)

(73) Assignee: Volvo Lastavagnat AB (SE)

( * ) Notice: Subject to any disclaimer, the term of this patent is extended or adjusted under 35 U.S.C. 154(b) by 0 days.

(21) Appl. No.: 09/530,763
(22) PCT Filed: Dec. 11, 1998
(86) PCT No.: PCT/SE98/02284
§ 371 (c)(1), (2), (4) Date: May 2, 2000
(87) PCT Pub. No.: WO99/33676
PCT Pub. Date: Jul. 8, 1999

(30) Foreign Application Priority Data

Dec. 18, 1997 (SE) .................................................. 9704731

(51) Int. Cl.⁷ .................................................. F16F 9/04
(52) U.S. Cl. ................................ 267/64.21; 267/64.28; 250/6.15
(58) Field of Search .................. 267/64.16, 64.19, 267/64.21, 64.23, 64.24, 64.27, 64.28

(56) References Cited

U.S. PATENT DOCUMENTS 2,981,354 A * 4/1961 Roller ........................ 180/360
3,218,055 A * 11/1965 Nallinger ...................... 267/65
4,648,621 A * 3/1987 Yokoya et al. ............ 280/6.157
5,111,735 A * 5/1992 Johnson ........................ 91/433
5,413,316 A * 5/1995 Easter ....................... 267/64.24

FOREIGN PATENT DOCUMENTS

| EP | 0 166 702 A2 |   | 1/1986 |
| EP | 0 474 171 A1 |   | 3/1999 |
| GB | 2 272 499    | * | 5/1994 |
| JP | 59-106308    | * | 6/1984 |

OTHER PUBLICATIONS

Patent Abstracts of Japan, vol. 8, No. 224, M–331 abstract of JP 59–106308 A (Isuzu Jidosha K.K.), Jun. 20, 1984.

* cited by examiner

Primary Examiner—Jack Lavinder
Assistant Examiner—Bradley King
(74) Attorney, Agent, or Firm—Lerner, David, Littenberg, Krumholz & Mentlik, LLP

(57) ABSTRACT

Methods for adjusting the elevation of a vehicle chassis mounted on an air spring are disclosed including supplying pressurized air to the air spring, pressurizing the bellows portion of the air spring in order to adjust the elevation of the vehicle chassis, and pneumatically isolating the bellows from the piston portion of the air spring, whereby the time for adjusting the elevation of the vehicle chassis is minimized by effecting the adjusting and pressurizing only the bellows. Apparatus for adjusting the elevation of a vehicle chassis are also disclosed.

15 Claims, 2 Drawing Sheets

AIR SPRING DEVICE FOR LOAD-CARRYING VEHICLES

FIELD OF THE INVENTION

The present invention relates to improvements in known air springs used for suspension of the chassis in heavy transport vehicles. Such air springs, which are generally connected between the chassis and the wheel axle, generally comprise a lower vessel, called a piston, made of a rigid, pressure-resistant material such as steel, and an upper bellows, mounted on the vessel, made of e.g. nylon-reinforced rubber and being in pneumatic connection with the piston.

BACKGROUND OF THE INVENTION

Air springs are generally commonly used today for transportation vehicles of various sizes. Depending on the size and weight of the vehicle, from two up to eight air spring units generally used, which may be arranged in pairs on a bogie. The air pressure in these air springs is in the order of about 8 bar, and the air spring pressure is maintained by means of one or more valves in a piping system connected to a pressurized tank which receives its compressed air from a compressor, which, in turn, is driven by the vehicle engine. The same air spring principle is also used for the cab suspension.

Since the upper part of these air springs consist of a bellows, the top cover of the bellows, which faces upwards, and supports the chassis, will therefore generally be pushed upwards by a higher pressure, and will be lowered by a lower pressure. In this manner, the height of the vehicle above ground level may be controlled, and it is also possible to tilt the vehicle in relation to the ground by using different pressure levels in the air springs on different sides of the vehicle. An inclination of the vehicle towards one side, caused by an uneven load, may also be adjusted by using different pressure levels in the air springs on both sides of the vehicle.

A level regulator, which can sense and control the level of the vehicle in relation to the ground, is arranged on the chassis, and this regulator, which supplies air to and/or discharges air from the air springs, can sense the level of the chassis in relation to the wheel axle or the ground.

A major advantage of these air springs, besides having excellent suspension properties, is that the height of the vehicle above ground level can be adjusted. This allows the vehicle to be lowered, and to be adjusted to a correct height which is suitable for the height of a loading ramp, or to be run in under a trailer and then be raised, to carry the load to be transported. A simple electric control box for such lowering and raising is provided in connection with the driver's cab, making it very simple for the driver to perform this raising and lowering operation.

In order to lower and raise the vehicle chassis by means of air springs, on the one hand requires that a large amount of air must be discharged to the environment when the chassis is lowered, and at the same time that air must be forced in again, from the pressurized air tank, when the chassis is raised. Since the amount of air under pressure, or to be pressurized, and which is accommodated in the air springs, is rather large, a substantial waiting time is required for the driver who wishes to lower or raise the vehicle, especially in the case of repeated height adjustments, e.g. when shunting several trailers or demountables, a waiting time that cannot be used for other activities. Particularly if the vehicle is without load and is to be lowered by its own weight, a rather long waiting time may occur. Consequently, there has for a long time existed a strong desire to reduce this waiting time.

SUMMARY OF THE INVENTION

In accordance with the present invention, this and other objects have now been realized by the invention of a method for adjusting the elevation of a vehicle chassis mounted on an air spring including a bellows and a rigid piston pneumatically connected to the bellows, the method comprising supplying pressurized air to the air spring, pressurizing the bellows in order to adjust the elevation of the vehicle chassis, and pneumatically isolating the bellows from the piston whereby the time for adjusting the elevation of the vehicle chassis is minimized by effecting the adjusting by pressurizing only the bellows. Preferably, the air spring includes a valve poppet movable between an open position and a closed position whereby the pneumatically isolating of the bellows from the piston comprises actuating the valve poppet to the closed position.

In accordance with one embodiment of the method of the present invention, the method includes providing the piston and the bellows with predetermined volume ratios whereby the amount of air required to adjust the elevation of the vehicle chassis is minimized.

In accordance with another embodiment of the method of the present invention, the method includes pressurizing the bellows only when the valve poppet is actuated to the closed position.

In accordance with the present invention, apparatus has also been discovered for adjusting the elevation of a vehicle chassis comprising an air spring including a bellows, a rigid piston pneumatically connected to the bellows, and a valve poppet movable between an open position and a closed position, whereby when the valve poppet is in the closed position the piston is pneumatically isolated from the bellows, and pressurizing means for pressurizing the bellows in order to adjust the elevation of the vehicle, whereby when the valve poppet is in the closed position the time for adjusting the elevation of the vehicle chassis is minimized by effecting the adjusting by pressurizing only the bellows.

In accordance with a preferred embodiment of the apparatus of the present invention, the piston comprises a pressure-resistant material, preferably steel.

In accordance with another embodiment of the apparatus of the present invention, the bellows comprises nylon-reinforced rubber.

In accordance with another embodiment of the apparatus of the present invention, the piston and the bellows have a predetermined volume ratio whereby the amount of air required for adjusting the elevation of the vehicle chassis is minimized.

In accordance with another embodiment of the apparatus of the present invention, the valve poppet is normally urged into the open position, but is activated into the closed position whenever the bellows is pressurized.

According to the present invention, an air spring for transport vehicles is provided, comprising a vessel ("piston") made of rigid, pressure-resistant material, such as steel, and a bellows fitted onto the vessel ("piston"), made of e.g. nylon-reinforced rubber, being in pneumatic connection with the "piston" and connected to a source of compressed air, the air spring being characterized by the "piston" being provided with an air shut-off valve in the opening towards the bellows.

According to the present invention, the valve may consist of, or be located in, a partition wall between the "piston" and the bellows.

The valve may, according to the present invention, consist of a rotary valve, which is closed and opened by a rotating motion.

According to the present invention, the valve may also consist of a seat/poppet valve, the poppet being raised and lowered by means of a piston in a separate cylinder inside the "piston," which is arranged to shut off the air inside the "piston," in a lowered position, while air is being discharged from or fed into the bellows, and to be open between the "piston" and the bellows, in a raised position, when air is neither discharged from or fed into the bellows.

BRIEF DESCRIPTION OF DRAWINGS

The present invention will be more fully appreciated with reference to the following detailed description, which, in turn, refers to the drawings, wherein.

DETAILED DESCRIPTION

Figure 1:
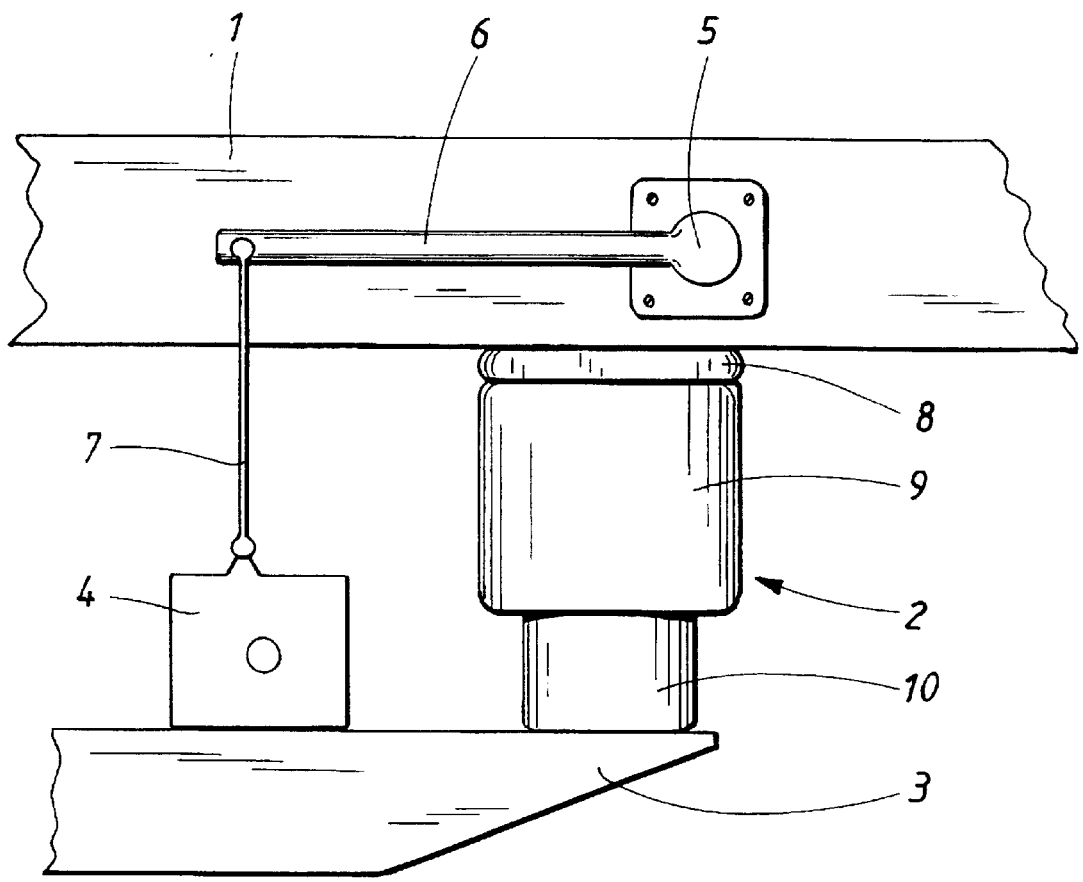
FIG. 1 is a side, elevational, schematic representation of the location of an air valve according to the present invention, as well as a level control valve controlling the amount of air in the air springs.

Referring to the drawings, FIG. 1 illustrates part of a frame 1 which is suspended by an air valve, generally designated by reference numeral 2, which air spring 2 in turn is suspended by an element 3 that may be part of a bogie, and which constitutes an assembly together with the wheel axle 4. A level control valve 5 is bolted to the frame 1. This valve is actuated by a lever 6 and a rod 7, which is flexibly connected to the lever 6, lever 7 having a perpendicular direction and abutting against the axle 4. As the frame 1 is vertically displaced in relation to the axle 4, a rotary motion will thus be created in the level control valve 5.

The level control valve, which has a piped connection to the top plate 8 of the bellows 9 of the air spring 2 (not shown), is connected by means of piping to a pressurized tank, which receives compressed air from a compressor driven by the vehicle engine.

The lower part of the air spring 2 is generally comprised of a cylindrical pressure vessel 10 made of a rigid material, such as steel, whereas the bellows 9, normally consists of nylon-reinforced rubber, and which is compressible.

In the position shown in FIG. 1, when the lever 6 is in a horizontal position, the level control valve is closed, but if the frame 1, for example through loading of the vehicle, compresses the bellows 9, the level control valve 5 is opened so as to allow compressed air to enter the bellows and restore the desired position. If, however, the frame is raised excessively, for example through unloading of the vehicle, the level control valve 5 will discharge air from the bellows 10, allowing the frame 1 to be lowered to the desired position.

The pressure in the air spring 2, and also the volume thereof, is thus controlled by injecting and discharging air. Thus, substantial amounts of air are required to be discharged or injected into the air valve 2, and this may require a rather long period of time, as the pressure is the same throughout the entire volume of air inside the air spring. One part of this air spring, i.e. the vessel 10, in technical jargon called the "piston", is however rigid and will not change its volume in dependence of its internal air pressure. According to the present invention, it is therefore preferred to close off this rigid component 10 during injection of air into, or discharge of air from, the air spring, in order to be able to control the pressure in the bellows 9 with a much smaller amount of air.

Figure 2:
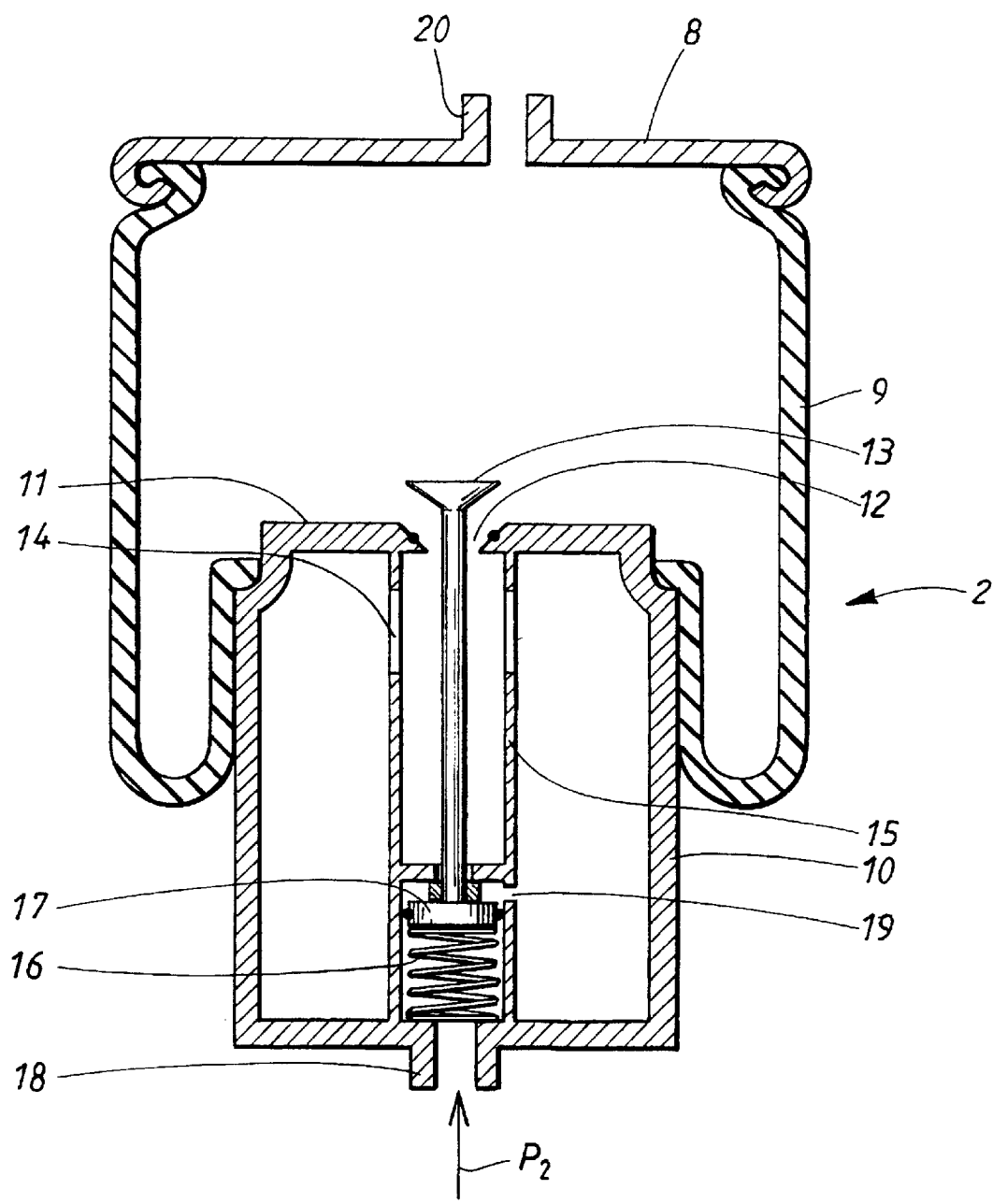
FIG. 2 is a side, elevational, cross-sectional view of an air spring according to the present invention with a shut-off valve for separating the air volume in the "piston" from that in the bellows.

FIG. 2 shows, in a vertical cross-section, an example of an air spring according to the present invention, comprising a top plate 8 and a bellows 9 arranged on the so-called "piston" 10. According to the present invention, a separation wall 11 is provided between the inside of the bellows 9 and the inside of the "piston" 10. In this separation wall 11, there is an aperture 12 that can be closed by means of a valve poppet 13. When the valve poppet 13 is in its upper position, as shown in the figure, the aperture 12 is not closed and the air inside the "piston" 10 as well as that inside the bellows 9 has the same pressure, as there are openings 14 in the cylinder 15 delimiting the aperture 12 on its lower side.

The position of the valve poppet 13 is governed by a compression spring 16, situated below a piston 17 connected to the valve poppet 13, and by an air pressure $P_2$ supplied through the opening 18.

When the pressure $P_2$ drops to zero through the action of a shut-off valve, the valve poppet 13 will move downwards, as the pressure inside the "piston" 10, which is the same as the pressure inside the bellows 9, will act on the top side of the piston 17 through the opening 19. This force acting on the top side of the piston 17 will be stronger than the force of the spring 16 acting in the opposite direction.

When the valve poppet 13 is closed, the pressure inside the bellows will also add to the downward force on the valve, and thus contribute to a correct closing thereof.

When the pressure $P_2$ is introduced again, the valve will be opened, as the pressure $P_2$ is higher than, or at least as high as, the pressure inside the bellows, and as the bottom surface area of the piston 17 is larger than the top area of the valve poppet 13.

A pipe connection 20 in the top plate 8 is shown in the figure, being connected to the level control valve 5 discussed above, for injecting and discharging air into/from the bellows 9.

As will be apparent from the figure, the cylinder 15 in the "piston" 10 is made integrally with, or fixedly secured to, the bottom of the "piston" 10 and the separation wall 11. The cylinder 15 will thus provide for reinforcement against the vertical force that will be applied onto the "piston" when the valve poppet 13 is closed and the pressure inside the bellows will act upon the separation wall 11.

As can be gathered from FIG. 2, the volume of the "piston" 10 is almost half of the entire volume of the air valve 2. At that pressure, around 8 bar, which is commonly used in such air springs, a substantially smaller amount of air will have to be supplied to, or be discharged from, the air spring 2 during lifting or lowering of the vehicle frame 1.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for adjusting the elevation of a vehicle chassis of a substantially stationary transport vehicle, said vehicle chassis mounted on an air spring including a bellows having a first interior portion and a rigid piston having a second interior portion pneumatically connected to said bellows, said first interior portion of said bellows being isolated from said second interior portion of said piston by a valve arranged therebetween, said method comprising supplying pressurized air to said air spring, pressurizing and depressurizing said first interior portion of said bellows in order to adjust said elevation of said vehicle chassis while said vehicle is substantially stationary, and closing said valv to pneumatically isolate said piston from said bellows, whereby the time for adjusting said elevation of said vehicle chassis is minimized by effecting said adjusting by pressurizing and depressurizing said bellows when said valve is in a closed position.

2. The method of claim 1, further including opening said valve when said air is neither injected into nor discharged from said bellows.

3. The method of claim 1 including providing said piston and said bellows with predetermined volume ratios whereby the amount of air required to adjust said elevation of said vehicle chassis is minimized.

4. The method of claim 1 further including pressurizing said bellows only when said valve is actuated to said closed position.

5. A method for raising and lowering a chassis of a substantially stationary transport vehicle including an air spring comprising a vessel and a bellows by injecting and discharging air into and out of said bellows, said method comprising supplying pressurized air from a source of compressed air to a vessel of rigid, pressure-resistant material; opening and closing a valve poppet arranged in an opening between said vessel and said bellows fitted onto the vessel, said bellows constructed of resilient material and being in pneumatic connection with said vessel; and actuating the raising and lowering of the chassis by injecting and discharging air into and out of said bellows, wherein the time period for the actuation of the raising and lowering is minimized by closing the valve poppet while injecting air into and discharging air out from said bellows.

6. The method of claim 5, further including opening said valve poppet when said air is neither injected into nor discharged from said bellows.

7. The method according to claim 5, wherein the consumption of air supplied during the raising and lowering is minimized by dimensioning the volume of the bellows and the vessel, respectively.

8. The method according to claim 5, wherein the supply of air to the bellows is only carried out when the valve poppet is closed.

9. The method of claim 5, wherein the vessel is constructed of steel.

10. The method of claim 5, wherein the bellows is constructed of nylon-reinforced rubber.

11. A method for adjusting the elevation of a vehicle chassis of a substantially stationary transport vehicle, said vehicle chassis mounted on an air spring comprising a flexible bellows having a first interior portion and a rigid piston having a second interior portion pneumatically connected to said bellows by a valve poppet, said piston having a third interior portion pneumatically coupled to said valve poppet, said method comprising supplying pressurized air to said first interior portion of said bellows, depressurizing said third interior portion of said piston for closing said valve poppet, pneumatically isolating said first interior portion of said bellows from said second interior portion of said piston upon closing said poppet valve, and pressurizing and depressurizing said first interior portion of said bellows when said valve poppet is closed in order to increase and decrease the elevation of said vehicle chassis while said vehicle is substantially stationary, whereby the time for adjusting said elevation of said vehicle chassis is minimized.

12. The method of claim 11, wherein the consumption of air supplied during the raising and lowering is minimized by dimensioning the volume of the bellows and the vessel, respectively.

13. The method of claim 11, wherein the supply of air to the bellows is only carried out when the valve poppet is closed.

14. The method of claim 11, further including opening said valve poppet when said air is neither injected into nor discharged from said bellows.

15. The method of claim 11, wherein the bellows are constructed of nylon-reinforced rubber.

* * * * *

UNITED STATES PATENT AND TRADEMARK OFFICE
CERTIFICATE OF CORRECTION

PATENT NO.    : 6,644,632 B1
DATED         : November 11, 2003
INVENTOR(S)   : Björn Jäberg It is certified that error appears in the above-identified patent and that said Letters Patent is hereby corrected as shown below:

Title page,
Item [73], "Assignee: Volvo Lastavagnat AB" should read
-- Assignee: Volvo Lastvagnar AB --.

Column 1,
Line 10, after the word "generally" insert the word -- are --.

Column 5,
Line 13, "valv" should read -- value --.

Signed and Sealed this

Thirteenth Day of January, 2004

JON W. DUDAS
*Acting Director of the United States Patent and Trademark Office*